United States Patent [19]

Bode et al.

[11] Patent Number: 4,548,613

[45] Date of Patent: Oct. 22, 1985

[54] YELLOW DISPERSE DYESTUFF MIXTURES AND DYEING PROCESS

[75] Inventors: Albert Bode, Schwalbach, Fed. Rep. of Germany; Thomas V. Chambers, Rockhill, S.C.; Manfred Hähnke, Kelkheim, Fed. Rep. of Germany; Wolfgang Kretzschmar, Charlotte, N.C.

[73] Assignee: American Hoechst Corporation, Somerville, N.J.

[21] Appl. No.: 612,186

[22] Filed: May 18, 1984

[51] Int. Cl.⁴ .............................................. C09B 29/36
[52] U.S. Cl. ........................................... 8/638; 8/639; 8/921; 8/922; 8/924
[58] Field of Search ................................... 8/638, 639

[56] References Cited

U.S. PATENT DOCUMENTS

| | | | |
|---|---|---|---|
| 2,006,022 | 6/1935 | Kranzlein et al. | 546/154 |
| 3,905,951 | 9/1975 | Berrie et al. | 534/774 |
| 4,101,551 | 7/1978 | Groll et al. | 8/583 |
| 4,327,018 | 4/1982 | Liechti et al. | 260/156 |
| 4,427,413 | 1/1984 | Bauerle | 8/471 |

*Primary Examiner*—A. Lionel Clingman
*Attorney, Agent, or Firm*—John P. Blasko; Hugh C. Crall

[57] ABSTRACT

C.I. Disperse Yellow 54 and 64 are important yellow dyestuffs of the quinophthalone type used in coloring synthetic fibers, particularly polyamide, polyester, acrylic and acetate fibers at boiling temperature conditions. Yellow azo dyestuffs of the hydroxypyridone type, e.g., C.I. Disperse Yellow 114, 180 227 and 230 have found widespread application in the high-temperature dyeing of such synthetic fibers. It has now been found that improved tinctorial results on these synthetic fiber materials can be obtained by applying a dyeing composition derived from these yellow coloring means and comprising a mixture of 70-90 parts by weight of one or more dyestuffs of the C.I. 54 and 64 type with 5 to 30 parts by weight of an azo dyestuff of the hydroxypyridone type. These improved dyestuff compositions exhibit superior leveling, high tinctorial strength or color build-up, high dyebath exhaustion and deep shade dyeing over the individual components. In addition, the dyestuff compositions of the invention are not phototropic.

18 Claims, No Drawings

YELLOW DISPERSE DYESTUFF MIXTURES AND DYEING PROCESS

BACKGROUND OF THE INVENTION

Synthetic fibers, e.g., polyester (PES), polyamide, acrylic and acetate fibers, can be exhaust-dyed with disperse dyestuffs by the high-temperature method at a temperature of about 105° C. to about 140° C., preferably about 130° C., or by the boiling temperature method at a temperature of about 95° C. to about 100° C. in the presence of carriers.

However, only a few selected disperse dyestuffs can produce all depths of shade when dyeing at the boil, which is carried out in open-type dyeing machines under atmospheric pressure. Despite the use of a carrier, many disperse dyestuffs only produce pale to medium depths of shade by this method.

In the field of coloring yellow hues on PES fibers under boiling temperature conditions, C.I. Disperse Yellow 54 and 64 have become established in industry as the most important yellow dyestuffs derived from quinophthalones for the self-shade and combination-shade dyeing. Disperse Yellow 54 and 64 produce bright reddish yellow dyeings having a high lightfastness level; though these dyestuffs are, in principle, suitable for all depths of shade both in dyeing at the boil and in high-temperature dyeing, they have, nevertheless, a number of disadvantages. Thus, the tinctorial strength is, as is typical for quinophthalone dyestuffs, relatively low. As a consequence thereof, dyestuff consumption and hence costs, are high, particularly in the case of deeper shades. Further, the dyeing of wound packages (cheese, muff or beam dyeing), in hank and piece dyeing, and in modern self-shade and combination-shade rapid dyeing methods, there is always a great danger of the finished dyeing being unlevel. Disperse Yellow 54 and 64 are particularly poor-leveling dyestuffs, unless an excessively long dyeing time is used for leveling out the dyeing. Finally, when the concentration of the dyestuff used relative to the weight of the PES fiber material is increased, the hue becomes undesirably more and more reddish, and consequently deep, neutral yellow dyeings are no longer obtainable.

As far as the field of yellow colorations of PES fibers under high-temperature dyeing conditions is concerned, azo dyestuffs of the hydroxypyridone type (e.g. C.I. Disperse Yellow 114, 180, 227 and 230) have become established in industry as important yellow dyestuffs for the self-shade and combination-shade dyeing. These dyestuffs produce bright greenish yellow dyeings having a high lightfastness level. They are suitable for dyeing all depths of shade under high-temperature dyeing conditions and are characterized by high tinctorial strength and consequently by low dyestuff consumption and low costs. However, these dyestuffs also have disadvantages. The distribution equilibrium at the end of the dyeing process (i.e., amount of dyestuff in the fiber compared with amount of dyestuff in the dyeing liquor) is such that, depending on the depth of shade being dyed, a certain amount of dyestuff does not exhaust onto the PES fiber. Moreover, a number of these dyestuffs are phototropic, so that it can be very difficult, depending on the optical conditions, to compare a sample of a completed dyeing with that of the shade to be matched. Further, a number of these dyestuffs are pH-sensitive, i.e., at a dyeing pH above 5 a considerable amount of the dyeing strength is lost, and no dyestuff of the hydroxypyridone type is suitable for dyeing at the boil, even in the presence of carriers. This means that the color build-up achieved under these dyeing conditions is low or at most of medium depth, which results in a high portion of non-exhausting dyestuff residue remaining in the dyebath. Consequently, dyestuffs costs are extremely high because of low dyestuff utilization, and it is impossible to obtain deep self-shade or combination-shade dyeings with this type of dyestuff.

The object of the present invention is to avoid the above-described disadvantages of the disperse-type yellow dyestuffs already known for use in the exhaust dyeing of synthetic fibers, such as polyamide, PES, acrylic and acetate fibers, in particular PES fibers, and their mixtures with other fibers.

SUMMARY OF THE INVENTION

It has now been found, surprisingly, that the before described disadvantages in exhaust dyeing of synthetic fibers such as polyamide, polyester, acrylic and triacetates, particularly polyester fibers, and their mixture with natural fibers such as wool or cotton or with regenerated cellulose fibers, can be avoided by using a mixture comprising 70–95, preferably 80–90 parts by weight of one or more yellow disperse dyestuffs of the general Formula I type, and 5–30, preferably 10–20 parts by weight of one or more yellow disperse dyestuffs of the general Formula II type. Dyestuff compositions of such characteristics are, in the first place, the principal object of this invention. These dyestuff mixtures can be used for exhausting at the boil (95° C.–100° C.) or under high temperature conditions (105° C.–140° C.) in the presence or absence of a customary carrier, and with or without the use of other disperse dyestuffs of different structure, to yield yellow self-shade or combination-shade colorations. The parts by weight of the individual dyestuff types specified above are based each time upon the total weight of the Formula I type and Formula II type dyestuffs, based on 100 parts by weight of said dyestuff composition and referring (in the case of commercial products) to the content of the respective pure dyestuff; the general formulae for the dyestuffs of this invention are as follows:

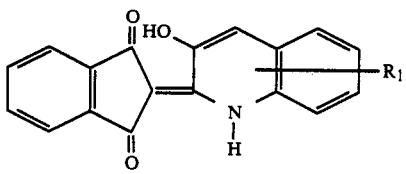

Formula I type where $R_1$ is a hydrogen or bromine atom;

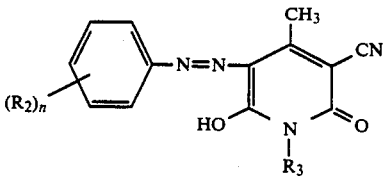

Formula II type where n=0, 1, 2, 3, 4 or 5; $R_2$ is a hydrogen atom when n=0 or is a substituent independently selected from a halogen atom, e.g. chlorine, fluorine or bromine, the cyano group, the nitro group, the trifluoromethyl group, an alkyl group of 1 to 4 carbon atoms, an alkoxy group of 1 or 4 carbon atoms, any aliphatic carboxylate group, any aromatic sulfonate group, any aliphatic or aromatic keto group, unsubstituted carboxyamide, any aliphatic carboxyamide group, unsubstituted sulfonamide, any aliphatic sulfonamide group or any aliphatic or aromatic sulfone group when n=an integer of from 1–5, preferably 1–3, (it being understood that when n=0 the number of hydrogens on the above identified phenyl ring is 5, and when n=5, the number of hydrogens is 0); and $R_3$ is a hydrogen atom, a straight-chain or branched alkyl group of 1 to 6 carbon atoms optionally interrupted in the chain by one or more ethereal oxygen atoms, or a benzyl group or a phenethyl group.

It should be noted that although $R_1$ is depicted in the above Formula I type structure as being located on the left-hand nitrogen substituted ring, it may be optionally located on the right-hand ring portion. Both positions are intended to be within the scope of this invention and the claims hereof.

Preferred Formula II type components of the mixtures are disperse dyestuffs having molecular structures as set forth below:

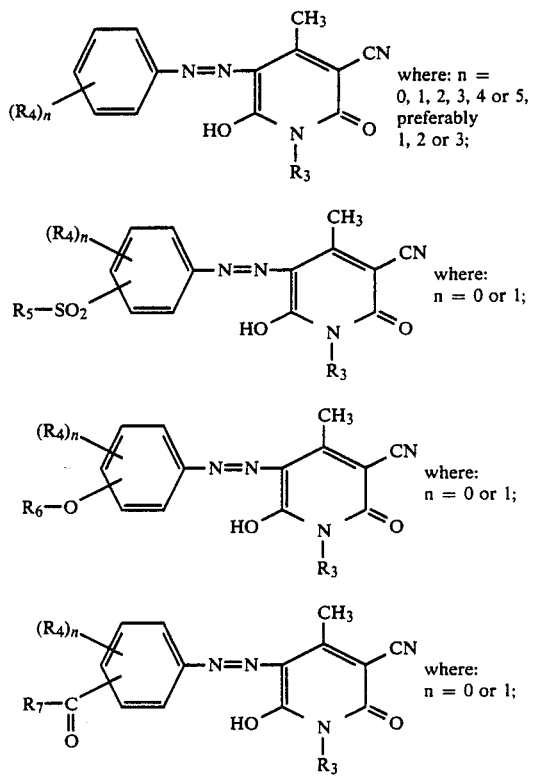

where $R_4$ is a hydrogen atom when n=0 or is a substituent independently selected from methyl, ethyl, chlorine, nitro, cyano, methoxy and ethoxy when n=an integer of from 1 to 5; $R_5$ is amino, an alkylamino of 1 to 4 carbon atoms, a dialkylamino of 1 to 4 carbon atoms per each alkyl, methyl, ethyl, phenyl or optionally a substituted phenoxy; $R_6$ is an alkyl of 1 to 4 carbon atoms which can also be interrupted in the chain by ethereal oxygen, or phenyl-sulfo; $R_7$ is an alkyl of 1 to 4 carbon atoms, an alkoxy of 1 to 4 carbon atoms, amino, an alkylamino of 1–4 carbon atoms, a dialkylamino of 1–4 carbon atoms per each alkyl, or a phenyl which can also be substituted by an alkyl of 1 to 4 carbon atoms; and in these preferred Formula II type compounds, the meaning of the "$R_4$" subscript "n" index is the same with regard to hydrogen replacement as was previously explained for the moiety $R_2$.

Particularly preferred Formula II type components of the mixtures are disperse dyestuffs having the following molecular structures:

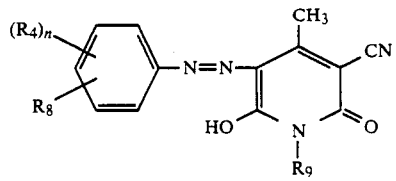

wherein: n = 0 or 1;

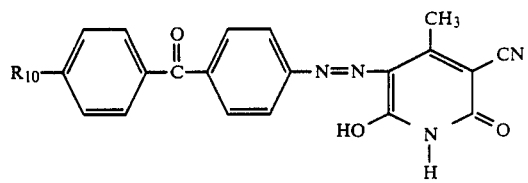

where $R_4$ is defined as indicated above; $R_8$ is hydrogen, methoxy, methyl, chlorine or nitro; $R_9$ is hydrogen, methyl or ethyl; and $R_{10}$ is hydrogen or an alkyl of 1 to 4 carbon atoms.

It is indeed already known to use for thermo-transfer printing, dyestuff mixtures of the following general Formulae I' and II' (European Patent Application No: 00 83,553 corresponding to U.S. Pat. No. 4,427,413) with the dyestuff of Formula II' being used in excess:

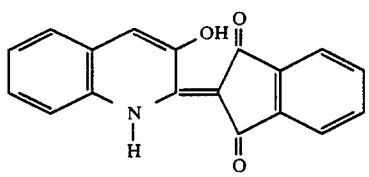

Formula I'

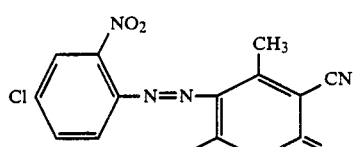

Formula II'

This use in a transfer printing, however, has no connection with the use in exhaust dyeing.

The individual disperse dyestuffs representing the components of the foregoing disclosed compositions are known as such and available applying manufacturing techniques usual in this field.

The preparation of the novel yellow dyestuff compositions according to this invention consisting essentially of dyestuffs of Formulae I and II type can be effected by mixing together ready-finished (i.e., highly water-dispersible) dyeing formulations of the individual base dyestuffs, or by mutually finishing the individual base dyestuffs in admixture, i.e., by jointly wet-grinding of mixtures of the individual dyestuffs in the presence of customary nonionic or anionic dispersants (for example a ligninsulfonate) in a conventional bead mill, optionally under conditions whereby the formation of mixed crystals derived from the individual base dyestuffs may occur. Likewise one or more additional dyestuff may be mixed with the dyestuffs of this invention to produce a different color or shade.

DETAILED DESCRIPTION OF THE PREFERRED EMBODIMENTS

Synthetic fibers which may be dyed with the compositions of this invention are polyamide, acrylic, triacetate and polyester (PES) fibers. The PES fibers include those based on polyethylene terephthalate, polybutylene terephthalate or polycyclohexylene terephthalate; PES fibers modified by copolymerization with polyethylene glycol, isophthalic acid or polymerizable phosphorus compounds; and mixtures of such PES fibers with fiber materials of natural origin such as wool or cotton, or with regenerated cellulose. The PES weight proportion in said fiber blends may be present in an amount of 10–90%, preferably 30–70%. Polyamide fibers include those fibers made from nylon-6, nylon-6:6 and their various modified forms and copolymers. This invention is applicable to the dyeing of such fibers in a variety of forms, for example in the form of loose flock, slubbing, yarn or piece goods.

The dyeing of the synthetic fibers or their mixtures with the dyestuff compositions of this invention is carried out by the standard exhaust method. Special mention is made employing this technique for exhaust dyeing at the boil, where the dyeing is done in open type dyeing machines at atmospheric pressure (e.g. reel becks), preferably in the presence of usual carriers, such as those based on orthophenylphenol, dichlorobenzenes, trichlorobenzenes, methylnaphthalenes, chloronaphthalenes, alkyl benzoates or kresotates, or diphenyl and the like. The dye bath may further contain one or more of the customary dispersants and/or leveling agents. In addition, dyeing may also be effected according to a conventional high-temperature (HT) exhaust method at temperatures approximately of 105° C. to about 140° C. The actual dyeing operation is advantageously followed by a reduction clear or a dispersant-assisted after-treatment for removing unfixed dyestuff.

In mixtures of PES fibers with wool, cotton, other natural fibers, or regenerated cellulose are used, the accompanying fiber portion of the blend can be dyed with suitable dyestuffs in the same or different shades (two-tone effects or woven designs) before or after the PES dyeing. The dyestuff compositions of the invention can be applied by themselves in the yellow region to produce bright, deep yellow dyeings, or combined with other commercial disperse dyestuffs of a different structural type resulting also in yellow shades or even with such disperse dyes yielding hues other than yellow, for example, red and blue dyestuffs (trichromatic dyeing), with the proviso that under the prevailing conditions all dyestuffs have similar absorbing properties; the achievable lightfastness of these dyeings is very good for the yellow self-shade, as well as the trichromatics. These other disperse dyestuffs can already be present in the ready-made dyestuff composition or are first added when the dyeing procedure is carried out in the sense of a combination-shade dyeing.

One particularly surprising aspect of the dyestuff mixtures representing the compositions of this invention in their improved dyebath exhaustion over that of the respective individual dyestuffs. Dyeing PES fibers at the boil (at 96°–98° C. for 60 minutes) in conjunction with a conventional carrier gives the following comparison of the dyebath exhaustion where the liquor concentration in percent dyestuff is calculated as pure dyestuff on the weight of the polyester:

| DISPERSE DYESTUFF | LIQUOR CONCENTRATION % DYESTUFF | % DYEBATH EXHAUSTION |
|---|---|---|
| (A) of the Formula I type | 0.4 | 97 |
| | 0.8 | 77 |
| | 1.5 | 43 |
| (B) of the Formula II type | 0.1 | 80 |
| | 0.2 | 43 |
| | 0.4 | 22 |
| | 0.6 | 14 |
| (C) A mixture of 90 parts by weight of Dyestuff A and 10 parts by weight of Dyestuff B | 0.2 | 97 |
| | 0.4 | 96 |
| | 0.8 | 95 |
| | 1.5 | 79 |

The dyestuff mixtures according to the invention have a very high tinctorial strength, favorable economics and can produce extraordinarily deep shades. The leveling behaviour of the dyestuff compositions of the invention is markedly better than that of C.I. Disperse Yellow 54 and 64, and the hues which can be obtained on synthetic fiber materials by the way of these dyestuff mixtures remain virtually constant from pale shades to very deep shades, i.e., there is no red shift with increasing level of the dyestuff composition.

When used in amounts that are conventional on a practical scale, relative to the fiber material to be dyed, the application of the compositions representing the present invention does not result in leaving behind in the dyebath, at the end of the dyeing process, i.e., after the distribution equilibrium has become established, any noticeable remainder of dyestuff not having been exhausted from the bath. The dyestuff mixtures of the invention have no marked phototropy in any case and are not pH sensitive between pH 3 and 6, under standard dyeing conditions for the foregoing disclosed fiber substances.

The following examples serve to illustrate the invention. Parts and percentages are by weight, unless stated otherwise:

EXAMPLE I 80 parts of a Formula I type disperse dyestuff having the following structure:

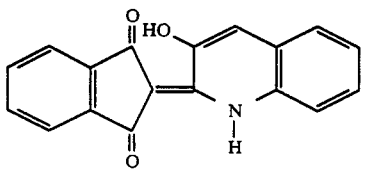

20 parts of a Formula II type disperse dyestuff having the following structure:

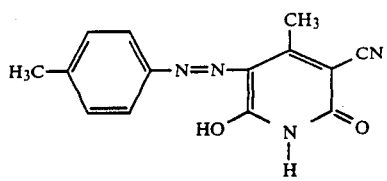

and 150 parts of a ligninsulfonate dispersant were mixed by water-wet bead-milling and thus converted into a fine dyestuff dispersion, which was spray dried.

For dyeing at the boil, 100 parts of a polyethylene terephthalate-type PES fiber in yarn form were treated in a dyeing beaker which contained 2,000 parts of water at 60° C., 2 parts of crystallized sodium acetate, 3 parts of a 30% strength acetic acid, 5 parts of a commercial carrier or diphenyl basis and 1 part of the dyeing formulation mentioned above. The dyebath temperature was then raised in the course of 30 minutes to 98° C.–100° C. and held there for 60 minutes. Thereupon, the dyebath was cooled and the yarn so dyed was rinsed, dried, and after-cured at 150° C. for 30 seconds under dry conditions. The tinctorial result was a bright yellow dyeing of high lightfastness, whilst only very little non-absorbed dyestuff remained in the exhausted dyebath.

The same dyeing result was obtained if a different type of a customary dispersant was used in preparing the dyeing formulation.

EXAMPLE II

Dyeing formulations were prepared in the manner described in Example I, but using this time the following ratios of the same Formulae I and II type disperse dyestuffs:

| Formula I | Formula II |
| --- | --- |
| 95 parts | 5 parts |
| 70 parts | 30 parts | and applying these batches to PES fibers in accordance with the procedure of Example I. The dyeing results obtained in this case were equivalent to those of Example I.

Dyeing in the presence of a different type of a conventional carrier likewise gives very high dyebath exhaustion.

EXAMPLE III 100 parts of a PES fiber of the polyethylene terephthalate type but modified to a minor proportion with butylene comonomers were used for the dyeing operation corresponding to a procedure which is otherwise the same as that described in Example I, except that no carrier was present in the dyeing liquor. The result achieved was likewise a very high dyebath exhaustion and a deep shade on the PES material.

The same good result was obtained when a modified polyethylene terephthalate PES fiber containing polyethylene glycol portions was dyed in the above manner but the rate of dyeing was slow.

EXAMPLE IV 85 parts of a disperse dyestuff of the Formula I type having the structure:

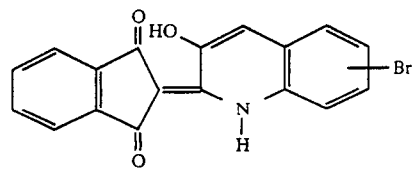

15 parts of a disperse dyestuff of the Formula II type having the structure:

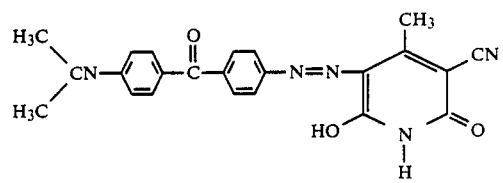

and 180 parts of a conventional dispersant comprising a sulfonated formaldehyde/naphthalene condensation product were converted into a finely divided dyestuff dispersion by aqueous bead-milling, and the said formulation was dried.

Two parts of this formulation were used for dyeing, at the boil and in the presence of 12 parts of an usual carrier based on a mixture of ortho-phenylphenol and methyl salicylate, 150 parts of a PES fiber of the polycyclohexylene terephthalate type. The tinctorial result was a deep yellow dyeing without appreciable amounts of non-absorbed dyestuffs have been left in the exhausted dyebath.

If the same dyeing had been carried out under HT-dyeing conditions at a temperature of 130° C. in the absence of a carrier, the tinctorial result was equally good.

EXAMPLE V

If the dyeing procedure at boiling temperature of the liquor specified in Example IV was repeated at 98° C.–100° C. for the coloration of a blend composed of 170 parts of PES fibers based on polyethylene terephthalate and 30 parts of cotton in the presence of the carrier mentioned, this gave the PES fiber component dyed deeply yellow side by side a well-reserved cotton portion.

EXAMPLE VI

Separate, finely divided and spray-dried dispersions were prepared by bead-milling in the presence of a dispersant, each of a Formula I disperse dyestuff having the following structure:

(comprising a mixture of bromination products with R = 50% H and 50% Br)

and of a Formula II disperse dyestuff having the following structure:

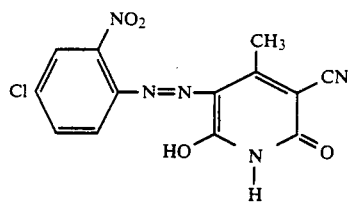

These respective dispersions of the above individual dyestuffs were then mixed in a ratio of 80 parts of the Formula I type and 20 parts of the Formula II type.

Ten parts of a PES fiber material in the form of a wound yarn package were then treated at 95° C.–98° C. for 90 minutes and assisted by the effect of a commercial carrier based on methylnaphthalene with an aqueous liquor which contained—for producing a combination-shade dyeing—0.1 part of the above described dispersion of the yellow type dyestuffs, 0.05 part of a commercial dyestuff of the type C.I. Disperse Blue 56 and 0.1 part of a commercial dyestuff of the type C.I. Disperse Red 73. This dyeing procedure gave a deep brown dyeing and very high exhaustion of the dyebath.

An equally good tinctorial result was obtained in the dyeing if, for carrying out the foregoing Example, a formulation was prepared from the individual dyestuffs by finishing them together, or by mixing the individually finished dyestuffs.

EXAMPLE VII–XXXI

Example I was repeated, except that the disperse dyestuff referred to therein as a Formula II type had been replaced by one of the disperse dyestuffs listed below wherein said Formula II type disperse dyestuff had the following general structural formula:

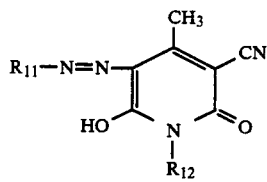

and wherein $R_{11}$ and $R_{12}$ are set forth respectively in the following table. The mixed dyestuff compositions of these Examples VII–XXXI showed a better color build-up than the individual dyestuffs.

| Example | $R_{11}$ | $R_{12}$ |
|---|---|---|
| VII | phenyl | —H |
| VIII | 4-Cl-phenyl | —CH₃ |
| IX | 4-Cl-2-NO₂-phenyl | —CH₃ |
| X | 4-F-2-NO₂-phenyl | —C₂H₅ |
| XI | 4-Br-2-NO₂-phenyl | —C₂H₅ |
| XII | 4-CF₃-2-NO₂-phenyl | —CH₃ |
| XIII | 4-O₂N-2-CN-phenyl | —H |
| XIV | 4-O₂N-2-Cl-phenyl | —C₃H₇(n) |
| XV | 2,4-di-CH₃-phenyl | —CH₃ |
| XVI | 4-(n)-C₄H₉-2-NO₂-phenyl | —CH₃ |
| XVII | 4-H₃CO-2-Cl-phenyl | —H |
| XVIII | 4-C₂H₅-phenyl | —H |
| XIX | 4-(H₃CO—CO—)-2-NO₂-phenyl | —C₄H₉(n) |
| XX | 4-(C₆H₅—O—SO₂—)phenyl | —CH₃ |
| XXI | 4-(H₃C—CO—)phenyl | —H and —CH₃ mixture (equal mixture) |
| XXII | 4-(C₆H₅—CO—)phenyl | —H |
| XXIII | 4-((H₃C)₂N—CO—)phenyl | —CH₃ |
| XXIV | 4-Cl-2-NO₂-phenyl | —C₂H₄—O—CH₃ |
| XXV | 4-(H₂NSO₂—)phenyl | —CH₃ |
| XXVI | 3-(H₃C—SO₂—)phenyl | —CH₃ |

-continued

| Example | R₁₁ | R₁₂ |
|---|---|---|
| XXVII | ⌬—SO₂—⌬— | —CH₃ |
| XXVIII | H₃C—⌬— | —CH₂—⌬ |
| XXIX | H₃C—⌬(NO₂)— | —C₂H₄—⌬ |
| XXX | H₃C—⌬(Cl)— | —C₆H₁₃(n) |
| XXXI | F—⌬(NO₂)— | —C₂H₄OC₂H₅ |

EXAMPLE XXXII

If, for dyeing according to Example I as the textile material, a commercially available cellulose triacetate fiber was dyed in place of the polyester fiber used in Example I, then an equally good dyeing resulted.

EXAMPLE XXXIII

If, for dyeing according to Example I as the textile material, a commercially available cellulose 2½—acetate fiber or a commercially available polyamide fiber were dyed in place of the polyester fiber of Example I, and if the dyeing was done without using the carrier mentioned in Example I, then in each case deep yellow dyeings were obtained, which left behind very highly exhausted dyebaths.

The dyestuff compositions of this invention as has previously been described (see e.g. Example VI), may be used in shade combination dyeings with other disperse dyestuffs of different structure, e.g., the dyestuff compositions of this invention may be used in shade combination dyeings with disperse dyes such as C.I. Disperse Yellow 23, Disperse Orange 25, Disperse Red 60, Disperse Red 65, Disperse Red 91, Disperse Blue 56, Disperse Blue 60, Disperse Blue 91, or with disperse dyes of other structural types.

We claim:

1. A dyestuff composition comprising a mixture of:
   (1) 70-95 parts by weight of at least one yellow disperse dyestuff, designated as a Formula I type dyestuff, having the formula:

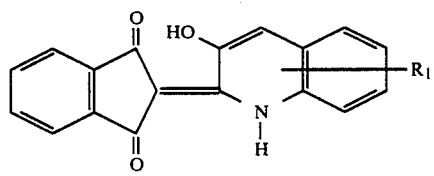

where $R_1$ is hydrogen or bromine;

(2) 5-13 parts by weight of at least one yellow disperse dyestuff, designated as Formula II type dyestuff, having the formula:

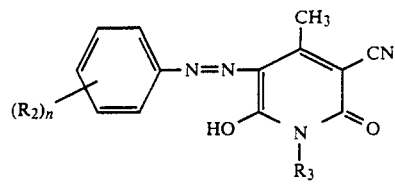

where: n=0, 1, 2, 3, 4 or 5;

$R_2$ is hydrogen when n=0 or is a substituent independently selected from halogen, cyano, nitro, trifluoromethyl, an alkyl of 1 to 4 carbon atoms, alkoxy of 1 to 4 carbon atoms, aliphatic carboxylate, aromatic sulfonate, aliphatic keto, aromatic keto, unsubstituted carboxyamide, aliphatic carboxyamide, unsubstituted sulfonamide, aliphatic sulfonamide, aliphatic sulfone or aromatic sulfone, when n=an integer of from 1 to 5; and $R_3$ is hydrogen, alkyl of 1 to 6 carbons, alkyl of 1 to 6 carbons containing ethereal oxygen, benzyl or phenethyl, wherein said parts by weight are calculated on 100 parts by weight of Formula I type and Formula II type dyestuff.

2. A dyestuff composition in accordance with claim 1, wherein the Formula II type dyestuff has the following formula:

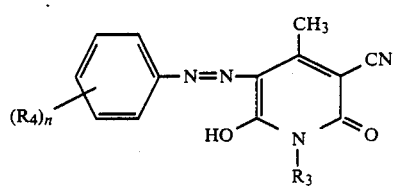

where n=0, 1, 2, 4 or 5; $R_3$ is defined as in claim 1; $R_4$ is hydrogen when n=0 or is a substituent independently selected from methyl, ethyl, chlorine, nitro, cyano, methoxy and ethoxy when n=an integer of from 1 to 5.

3. A dyestuff composition according to claim 2, wherein said Formula II type dyestuff has the following formula:

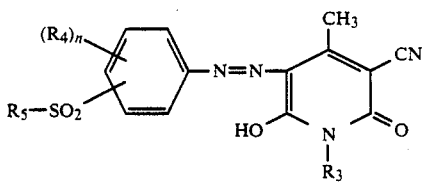

where n=0 or 1; $R_3$ is defined as in claim 1; $R_4$ is defined as in claim 2; and $R_5$ is amino, alkylamino of 1 to 4 carbons, dialkylamino of 1 to 4 carbons per each alkyl, methyl, ethyl, phenyl or substituted phenoxy.

4. A dyestuff composition according to claim 2, wherein said Formula II type dyestuff has the formula:

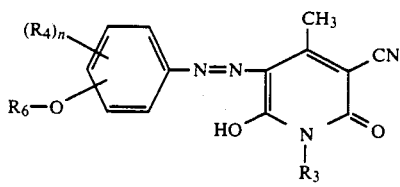

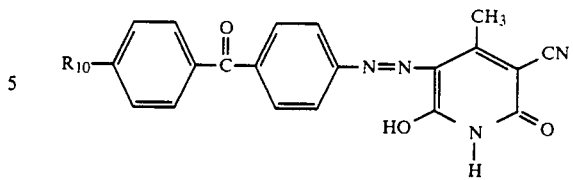

where n=0 or 1; $R_3$ is defined as in claim 1; $R_4$ is defined as in claim 2; and $R_6$ is alkyl of 1 to 4 carbons, or alkyl of 1 to 4 carbons containing ethereal oxygen or phenylsulfo.

5. A dyestuff composition according to claim 2, wherein said Formula II type dyestuff has the formula:

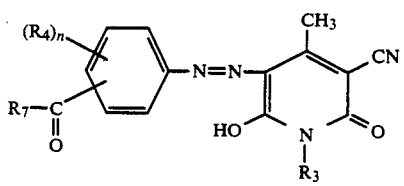

where n=0 or 1; $R_3$ is defined as in claim 1; $R_4$ is defined as in claim 2; and $R_7$ is alkyl of 1 to 4 carbons, alkoxy of 1 to 4 carbons, amino, alkylamino, or phenyl or phenyl substituted by alkyl of 1 to 4 carbons.

6. A dyestuff composition according to claim 2, wherein said Formula II type dyestuff has the formula:

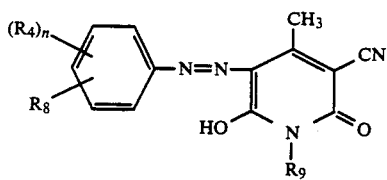

where n=0 or 1; $R_4$ is defined as in claim 2; and $R_8$ is hydrogen, methoxy, methyl, chlorine or nitro; and $R_9$ is hydrogen, methyl or ethyl.

7. A dyestuff composition according to claim 2, wherein said Formula II type dyestuff has the formula:

where $R_{10}$ is hydrogen or alkyl of 1 to 4 carbons.

8. A dyestuff composition according to claim 1, 2, 3, 4, 5, 6 or 7 containing at least one other disperse dyestuff and wherein said at least one other disperse dyestuff has a structural formula different from the structure of said Formula I and Formula II type dyestuffs.

9. A dyestuff composition according to claims 1, 2, 3, 4, 5, 6 or 7, wherein said dyestuff designated as Formula I type is present in an amount of from 80–90 parts by weight, and said dyestuff designated as Formula II type is present in an amount of 10–20 parts by weight, calculated on 100 parts by weight of Formula I type and Formula II type dyestuffs.

10. A process for dyeing a fiber using a dyestuff composition in accordance with claim 1.

11. A process according to claim 10, wherein said fiber is selected from the group consisting of polyester, polyamide, and cellulose acetate.

12. A process according to claim 10, wherein said polyester fiber is a copolymer with another monomer selected from the group consisting of polyethylene glycol, isophthalic acid or polymerizable phosphorus compounds.

13. A process according to claim 10, wherein said dyeing operation is an exhaust method at high temperature conditions.

14. A process according to claim 10, wherein said dyeing operation is an exhaust method at boiling temperature of the aqueous dyeing medium under atmospheric pressure.

15. A process according to claim 10, wherein the dyeing operation is carried out in the presence of a carrier.

16. A process according to claim 10, wherein said dyeing composition is used in combination with at least one other disperse dyestuff having a structure different from that of said Formula I type and Formula II type disperse dyestuffs.

17. A fiber having therewith a dyestuff composition in accordance with claims 1, 2, 3, 4, 5, 6 or 7.

18. A fiber according to claim 17, wherein said fiber is selected from the group consisting of polyester, polyamide and cellulose acetate.

* * * * *

UNITED STATES PATENT AND TRADEMARK OFFICE
CERTIFICATE OF CORRECTION

PATENT NO. : 4,548,613

DATED : October 22, 1985

INVENTOR(S) : Albert Bode, Thomas V. Chambers, Manfred Hahnke, Wolfgang Kretzschmar It is certified that error appears in the above-identified patent and that said Letters Patent is hereby corrected as shown below:

In claim 1, column 11, line 66, delete "13" and substitute --30--.

In claim 2, column 12, line 43, between "n = 0, 1, 2," and "4 or 5" insert --3,--.

Signed and Sealed this

Twenty-fifth Day of February 1986

[SEAL]

Attest:

DONALD J. QUIGG

Attesting Officer

Commissioner of Patents and Trademarks